United States Patent
Chung et al.

(10) Patent No.: US 10,481,669 B2
(45) Date of Patent: Nov. 19, 2019

(54) CPU CONTROL METHOD AND APPARATUS FOR IMPROVING APPLICATION PROCESSING SPEED AND POWER CONSUMPTION

(71) Applicant: INDUSTRY-ACADEMIC COOPERATION FOUNDATION, YONSEI UNIVERSITY, Seoul (KR)

(72) Inventors: Jong Moon Chung, Seoul (KR); Sung Woong Jo, Seoul (KR); Tae Young Ha, Seoul (KR); Tae Hyun Kyong, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 892 days.

(21) Appl. No.: 14/863,039

(22) Filed: Sep. 23, 2015

(65) Prior Publication Data

US 2016/0086083 A1 Mar. 24, 2016

(30) Foreign Application Priority Data

Sep. 24, 2014 (KR) .................. 10-2014-0127639

(51) Int. Cl.
| | |
|---|---|
| *G06F 1/03* | (2006.01) |
| *G06F 1/3228* | (2019.01) |
| *G06F 1/324* | (2019.01) |
| *G06F 11/34* | (2006.01) |

(52) U.S. Cl.
CPC ............ *G06F 1/3228* (2013.01); *G06F 1/324* (2013.01); *G06F 11/3419* (2013.01); *G06F 2201/81* (2013.01); *Y02D 10/126* (2018.01); *Y02D 10/34* (2018.01)

(58) Field of Classification Search
CPC ..................................................... G06F 1/3228
See application file for complete search history.

(56) References Cited

U.S. PATENT DOCUMENTS

| | | | | |
|---|---|---|---|---|
| 5,613,129 A | * | 3/1997 | Walsh | ...................... G06F 13/24 710/262 |
| 2009/0198907 A1 | * | 8/2009 | Speight | ............... G06F 12/0862 711/137 |
| 2010/0037080 A1 | * | 2/2010 | Kawashima | .......... G06F 1/3203 713/500 |

(Continued)

FOREIGN PATENT DOCUMENTS

| | | |
|---|---|---|
| JP | 2008-077563 A | 4/2008 |
| JP | 2010-524087 A | 7/2010 |

*Primary Examiner* — Li B. Zhen
*Assistant Examiner* — Tsu-Chang Lee

(57) ABSTRACT

A CPU control method and apparatus for improving application processing speed and power consumption are provided. An embodiment of the invention provides a method by which a CPU control apparatus controls a CPU, where the CPU control method includes: (a) measuring a reaction time of a user terminal for a running application; (b) computing a first predictive reaction time by stepwise changing a CPU frequency if the reaction time exceeds a preset threshold; (c) computing a second predictive reaction time by stepwise changing a processing weight of the application if the first predictive reaction time exceeds the preset threshold; and (d) repeating said step (c) if the second predictive reaction time exceeds the preset threshold.

12 Claims, 6 Drawing Sheets

(56) References Cited

U.S. PATENT DOCUMENTS

| | | |
|---|---|---|
| 2011/0099404 A1 | 4/2011 | Hartmann et al. |
| 2011/0153822 A1* | 6/2011 | Rajan .................... G06F 9/5055 709/225 |
| 2014/0281613 A1 | 9/2014 | Kaito |
| 2014/0285447 A1* | 9/2014 | Chang ................. G06F 3/04883 345/173 |
| 2015/0067819 A1* | 3/2015 | Shribman ............... H04L 67/06 726/12 |

* cited by examiner

CPU CONTROL METHOD AND APPARATUS FOR IMPROVING APPLICATION PROCESSING SPEED AND POWER CONSUMPTION

CROSS-REFERENCE TO RELATED APPLICATIONS

This application claims the benefit of Korean Patent Application No. 10-2014-0127639, filed with the Korean Intellectual Property Office on Sep. 24, 2014, the disclosure of which is incorporated herein by reference in its entirety.

BACKGROUND

1. Technical Field

The present invention relates to a method and apparatus for controlling a CPU, more particularly to a CPU control technology for improving application processing speed and improving power consumption in an embedded system.

2. Description of the Related Art

An important goal of research in mobile systems such as smart phones and tablet computers is to reduce power consumption while maintaining the level of performance of the applications.

Recently, as applications grow in complexity and require fast processing, the performance of hardware such as CPU's, GPU's, and RAM is likewise increasing to support such requirements. However, such requirements may increase power consumption and may result in shorter battery life.

To improve power consumption, many Android-based smart devices adopt Dynamic Voltage and Frequency Scaling (DVFS) technology.

DVFS is a technique of reducing power consumption by reducing CPU frequency and voltage. Since the power consumed by a CPU is proportion to the CPU frequency, DVFS can reduce the power consumption of the CPU by reducing the frequency of the CPU.

However, reducing the CPU frequency also means reducing the processing speed and thus results in slower reaction times for interactive applications.

Generally, the 'response time' refers to the time between a user's input and the system's reaction. Many applications that are run on a smart device may employ a user interface (UI) as an interactive application.

Other examples of interactive applications include games, web browsers, image editors, etc.

In an interactive application, the reaction time is a very important factor. Although it may be different for each user, there have been research results that indicate that a typical user feels inconvenienced when the reaction time exceeds 150 ms.

Thus, it is highly important that the reaction time stay within this threshold time.

Also, since a smart device provides multi-tasking functionality, the interactive application may be run simultaneously with several background applications.

In such an environment, the interactive application and the background applications have to share a limited amount of CPU resources, which makes it even more difficult for the interactive application to meet the threshold for the reaction time.

A CPU scheduler serves to distribute the CPU resources to tasks that are running, and as such, has a great impact on the performances of the tasks.

One example of a CPU scheduler, the Completely Fair Scheduler (CFS), is a default scheduler that has been used since Linux Kernel 2.6.23. The CFS was designed with the goal of ensuring fairness to the tasks that are running and applies the same processing weight on all applications running on an Android-based smart device.

Thus, when the CFS is used, a problem may occur of the interactive application showing a slow reaction time when the interactive application is running concurrently with background applications.

Thus, the DVFS technology based on CPU loads as found in the related art can cause in an inefficient increase in CPU frequency when there is a high CPU load on the background applications, resulting in wasteful power consumption, and can provide a slow reaction time when an interactive application is running if the CPU frequency is not quickly increased.

SUMMARY OF THE INVENTION

An aspect of the invention, devised to resolve the problems in the related art described above, is to provide a way to adjust the CPU frequency and the processing weight of an interactive application in order to reduce power consumption while satisfying the threshold for the reaction time of the interactive application.

To achieve the objective above, an embodiment of the invention provides a method by which a CPU control apparatus controls a CPU, where the CPU control method includes: (a) measuring a reaction time of a user terminal for a running application; (b) computing a first predictive reaction time by stepwise changing a CPU frequency if the reaction time exceeds a preset threshold; (c) computing a second predictive reaction time by stepwise changing a processing weight of the application if the first predictive reaction time exceeds the preset threshold; and (d) repeating said step (c) if the second predictive reaction time exceeds the preset threshold.

To achieve the objective above, an embodiment of the invention provides a CPU control apparatus for controlling a CPU that includes: a reaction time measurement part configured to measure a reaction time of a user terminal for a running application; a reaction time prediction part configured to compute a first predictive reaction time by stepwise changing a CPU frequency if the reaction time exceeds a preset threshold and configured to compute a second predictive reaction time by stepwise changing a processing weight of the application if the first predictive reaction time exceeds the preset threshold; and a control part configured to control the reaction time prediction part to re-compute the second predictive reaction time if the second predictive reaction time exceeds the preset threshold.

According to an embodiment of the invention, a technique of adjusting the CPU frequency and the priority of the interactive application simultaneously is applied, to provide superior performance in terms of power consumption and reaction time, compared to the existing method which adjusts the CPU frequency based on the load on the CPU and causes wasteful power consumption and slow reaction time.

Moreover, whereas existing methods cannot improve both power consumption and reaction time simultaneously, an embodiment of the present invention may concurrently adjust the CPU frequency and the processing weight of the interactive application to simultaneously improve power consumption and the reaction time.

Additional aspects and advantages of the present invention will be set forth in part in the description which follows, and in part will be obvious from the description, or may be learned by practice of the invention.

DETAILED DESCRIPTION OF THE INVENTION

Figure 1:
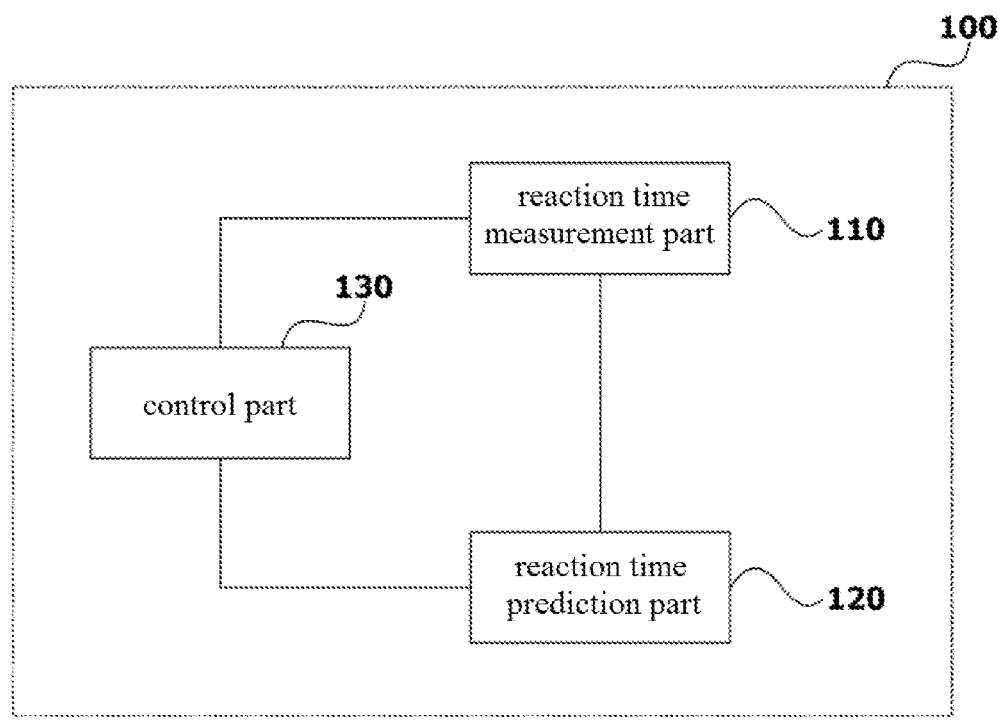
FIG. 1 illustrates the composition of a CPU control apparatus for improving application processing speed and power consumption according to an embodiment of the invention.

The present invention will be described below with reference to the accompanying drawings. However, the present invention can be implemented in several different forms and is not limited to the embodiments described herein.

In order to describe embodiments of the present invention with greater clarity, certain parts have been omitted in the drawings, and like reference numerals have been used for like parts throughout the specification.

In the specification, the description that a part is "connected" to another part refers not only to those cases in which the parts are "connected directly" but also to those cases in which the parts are "connected indirectly" by way of one or more other members interposed therebetween.

Also, the description that a part "includes" a component means that additional components may further be included and does not preclude the existence of other components unless specifically indicated.

Certain embodiments of the invention will now be described in more detail with reference to the accompanying drawings.

FIG. 1 illustrates the composition of a CPU control apparatus for improving application processing speed and power consumption according to an embodiment of the invention.

The CPU control apparatus 100 for improving application processing speed and power consumption according to an embodiment of the invention can estimate the reaction time of a smart device in real time by using a reaction time prediction model for the user terminal, and thereby calculate the optimal CPU frequency and processing weight of the interactive application that can minimize power consumption while satisfying the threshold for the reaction time, to apply them to the smart device.

For this, the CPU control apparatus 100 can include a reaction time measurement part 110, a reaction time prediction part 120, and a control part 130.

Looking at each component in more detail, the reaction time measurement part 110 can measure the service time of the interactive application (hereinafter referred to as the "application") and the reaction time of the smart device.

Here, the reaction time measurement part 110 can measure the service time of the application by using Equation 1 shown below.

$$T_S(f) = \frac{\alpha}{f} + \beta \quad \text{[Equation 1]}$$

Here, α represents the amount of processing of application tasks that are affected by the CPU frequency, β represents the amount of processing of application tasks that are not affected by the CPU frequency, and f represents the frequency of the currently operating CPU.

While the processing speed is determined according to the CPU frequency for most tasks, some of the tasks are not affected by CPU frequency and require absolute amounts of time. The model as represented by Equation 1 was thus designed to reflect this.

Also, the reaction time measurement part 110 can measure the reaction time $T_R(f_{CPU}, n^*)$ where the CPU frequency is $f_{CPU}$ and the processing weight for a target application is $n^*$.

Here, the "target application" can refer to the application that is currently shown to the user from among the several applications running on the smart device, and the "processing weight" can refer to the priority of a task, an example of the processing weight being the nice value used in Linux kernel version 3.4.0.

Incidentally, the reaction time measurement part 110 can measure the service time of an application by using Equation 1 above or by using a different method.

For example, the measurement can be performed using utime and stime, which are the fourteenth and fifteenth values of /proc/{PID}/stat that is provided for each application having different process identifiers (PID) in Linux kernel version 3.4.0.

Here, $utime_t$ and $stime_t$ are the times during which each application received processing by the CPU in the user mode and the kernel mode since the first operation of the application up to a time t.

Using $utime_t$ and $stime_t$ to express $T_S(n^*)$, which is the service time during which an application having a nice value of $n^*$ received processing by the CPU between $t_1$ and $t_2$:

$$T_s(n^*) = [\{utime_{t_2}(n^*) + stime_{t_2}(n^*)\} - \{utime_{t_1}(n^*) + stime_{t_1}(n^*)\}]/HZ$$

where HZ is a constant and has a value of 100 in Linux kernel version 3.4.0.

The reaction time prediction part 120 can use a reaction time maximum change prediction model to predict the maximum amount of change in reaction time when the current CPU frequency is changed from $f_{CPU}$ to $f_x$ or when the processing weight of a target application is changed from the current $w^*$ to $w^*_y$.

Here, the reaction time maximum change prediction model can be expressed as Equation 2 shown below.

$$\Delta_R = T_S(f_x) \frac{w^*_y + \sum_{\forall i \in S} w_i}{w^*_y} - T_S(f_{CPU}) \frac{w^* + \sum_{\forall i \in S} w_i}{w^*} \quad \text{[Equation 2]}$$

$f_{CPU}$ is the value of the current CPU frequency, and $f_x$ represents the value to which the CPU frequency will be changed.

$w_i$ represents the value of the processing weight of application i, $w^*$ represents the value of the processing weight of the target application, and $w^*_y$ represents the value to which the processing weight of the target application will be changed.

Also, S represents the set of tasks being processed by the CPU, excluding the target application.

Incidentally, the "processing weight" is a value that has a one-to-one correspondence relationship with the "priority value" of the task.

One example of a value that represents the priority of a task is the nice value used in Linux kernel version 3.4.0. The nice value is an integer between −20 to 19, where a smaller value indicates higher priority.

If an application having a nice value of $n^i$ has a processing weight of $w_{n^i}$, then $w_{n^i} = 1.25^{-n^i} w_0$.

Here, $w_0$ represents the processing weight of an application having a nice value of 0, and with the nice value converted to a processing weight with respect to Linux kernel version 3.4.0, $w_0$ would have a value of 1024.

Also, $w_n^*$ represents the processing weight of the target application and can be expressed as $w_n^* = 1.25^{-n^*} w_0$. Substituting these variables in Equation 2, the following can be obtained.

$$\Delta_R = T_S(f_x) \frac{w_{n^*y} + \sum_{\forall i \in S} w_{n^i}}{w_{n^*y}} - T_S(f_{CPU}) \frac{w_{n^*} + \sum_{\forall i \in S} w_{n^i}}{w_{n^*}}$$

The reaction time maximum change prediction model according to an embodiment of the invention, such as the one above, can be applied to a scheduler in a smart device that determines the duration of processing by the CPU according to the processing weight of each application and has the procedures in the execution queue processed in turn.

With such a scheduler, it is assumed that those factors that have the most impact on the difference in reaction times when the CPU frequency or the processing weight of an application is changed are occupied in advance by tasks of other applications.

$T_S(f_x)$ and $T_S(f_{CPU})$ represent the service times of an application obtained by Equation 1, and are incorporated in the model because the amount of change in the reaction time increases in proportion to the service time of the application.

Also, the reaction time prediction part 120 uses the model for predicting the reaction time of a target application to compute a predictive reaction time according to the changed CPU frequency or nice value of the target application.

Here, the model for predicting the reaction time of the target application can be expressed as Equation 3 shown below.

$$T_R(f_x, n^*_y) = T_R(f_{CPU}, n^*) + \Delta_R \quad \text{[Equation 3]}$$

Here, $T_R(f_x, n^*_y)$ represents the predictive reaction time, $T_R(f_{CPU}, n^*)$ represents the reaction time measured by the reaction time measurement part 110 in the currently operating smart device, and $\Delta_R$ is the result obtained from Equation 2.

Also, $f_x$ and $n^*_y$ represent the CPU frequency and the nice value of the target application that are to be changed, respectively, while $f_{CPU}$ and $n^*$ represent the CPU frequency and the nice value of the target application currently in operation, respectively.

The control part 130 can periodically execute the reaction time measurement part 110 and, when the predictive reaction time is computed for the smart device by the reaction time prediction part 120, can accordingly find the optimal CPU frequency that can minimize power consumption while satisfying the threshold for the reaction time and then adjust the processing weight of the application and apply it to the smart device.

This is described below in further detail with reference to FIG. 2.

Figure 2:
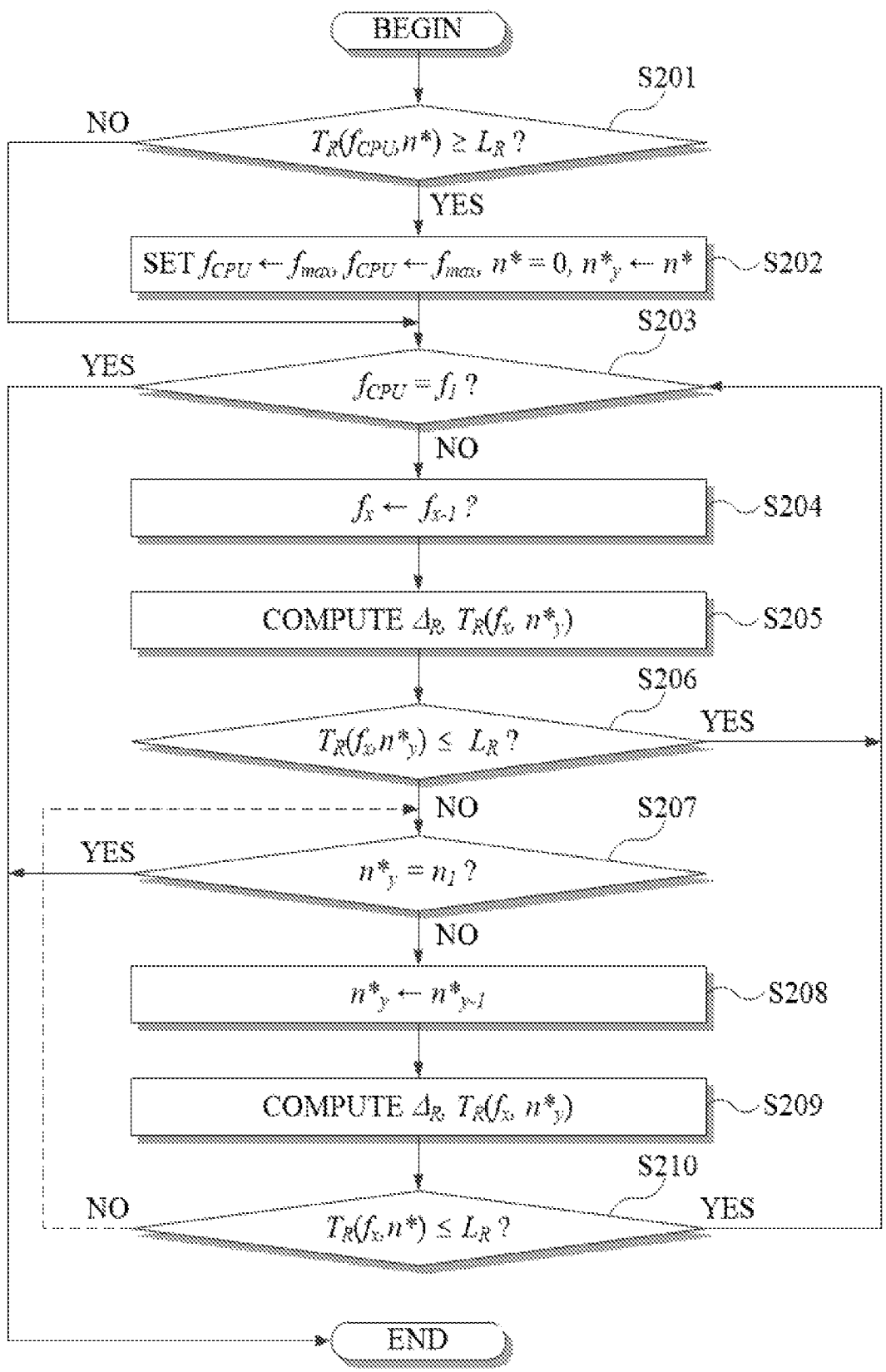
FIG. 2 is a flowchart illustrating the procedures of controlling a CPU for improving application processing speed and power consumption according to an embodiment of the invention.

FIG. 2 is a flowchart illustrating the procedures of controlling a CPU for improving application processing speed and power consumption according to an embodiment of the invention.

The reaction time measurement part 110 may measure the reaction time of the smart device, and the control part 130 may determine whether or not the measured reaction time exceeds the reaction time threshold $L_R$ (S201).

If the result of the determining is that the threshold is exceeded, then in order to immediately remedy the user's inconvenience, the control part 130 may change the currently operating CPU frequency $f_{CPU}$ to $f_{max}$, the highest frequency the CPU can have, and may set the nice value $n^*$ of the target application to an initial value by assigning the default 0 assigned by the CFS (S202).

Thus, the value $f_x$ to which the CPU frequency will be changed may become $f_{max}$, and the value to which the nice value of the target application will be changed may become 0.

After operation S202, the control part 130 may check whether or not $f_{CPU}$ is the lowest CPU frequency $f_1$ (S203).

If $f_{CPU}$ is $f_1$, then the CPU frequency cannot be lowered any further, and thus the control part 130 may operate the smart device without changing the CPU frequency and the nice value of the target application.

Incidentally, the range of the CPU frequency may be set from $f_1$ to $f_{max}$, $f_1$ being the lowest frequency. In operation S202, $f_{CPU}$ was changed to $f_{max}$ in order to immediately remedy the user's inconvenience, so that the control part 130 may perform the procedure of operation S204.

After operation S203, the control part 130 may set $f_x$ one step lower to $f_{x-1}$ S204) and may operate the reaction time prediction part 120 to compute the predictive reaction time for the smart device with the one-step lowered CPU frequency (S205).

After operation S205, the control part 130 may check whether or not the predictive reaction time computed in operation S205 exceeds the reaction time threshold $L_R$ (S206).

That is, since $f_{CPU}$ is operating as $f_{max}$ in order to immediately remedy the current user's inconvenience, the predictive reaction time may be computed with the frequency at one step lower than $f_{max}$ and compared with the reaction time threshold $L_R$.

If, as a result of operation S206, the predictive reaction time computed in operation S205 is found to be smaller than the reaction time threshold $L_R$, then the control part 130 may repeat the procedures of operations S203 to S206 so as to set the CPU frequency to a lower value, looking for the optimum frequency by lowering the CPU frequency step by step to a lower frequency until the predictive reaction time of the smart device exceeds the reaction time threshold $L_R$. This is because a lower frequency of the CPU can provide a greater reduction in power consumption.

If, as a result of operation S206, the predictive reaction time computed in operation S205 is found to be exceed the reaction time threshold $L_R$, then the control part 130 may check whether or not the nice value $n^*_y$ of the target application is the lowest value $n_1$ (S207).

If, as a result of operation S207, $n^*_y$ is found to be $n_1$, then the nice value of the target application cannot be lowered any further, so that the control part 130 may operate the smart device with the optimum CPU frequency found by the procedures above without changing the nice value of the target application.

If, as a result of operation S207, $n^*_y$ is found not to be the lowest nice value, then the control part 130 may set the value $n^*_y$, to which the nice value of the target application will be changed, one step lower to $n^*_{y-1}$ (S208) and may operate the reaction time prediction part 120 to compute the predictive reaction time for the smart device with the one-step lowered nice value of the target application applied (S209).

After operation S209, the control part 130 may check whether or not the predictive reaction time computed in operation S209 exceeds the reaction time threshold $L_R$ (S210).

If, as a result of operation S210, the predictive reaction time computed in operation S209 is found to exceed the reaction time threshold $L_R$, then the control part 130 may repeat the procedures of operations S207 to S210 until the predictive reaction time computed in operation S209 is smaller than the reaction time threshold $L_R$, so as to find the optimum nice value.

This is because a lower nice value means an increased amount of tasks that can be processed at once (an increase in the time allotted for processing tasks), and therefore under conditions of the same CPU frequency, a better response time can be expected from a lower nice value.

If, as a result of operation S210, the predictive reaction time computed in operation S209 is found to be smaller than the reaction time threshold $L_R$, then the control part 130 may perform operation S203 to further lower $f_{CPU}$.

FIG. 3 through FIG. 6 are graphs of actual test results that show how the power consumption was improved in a smart device by the control of the CPU for improving application processing speed and power consumption according to an embodiment of the invention.

To analyze the performance of the algorithm for adjusting the CPU frequency and the processing weight of the application as proposed by an embodiment of the invention, the performance was compared with that of the Ondemand Governor, which is one of the most frequently used in smart devices.

The smart device used for the performance analysis is Samsung's Galaxy S4 LTE-A smart phone. In the tests, $L_R$ was set to 150 ms.

Figure 3:
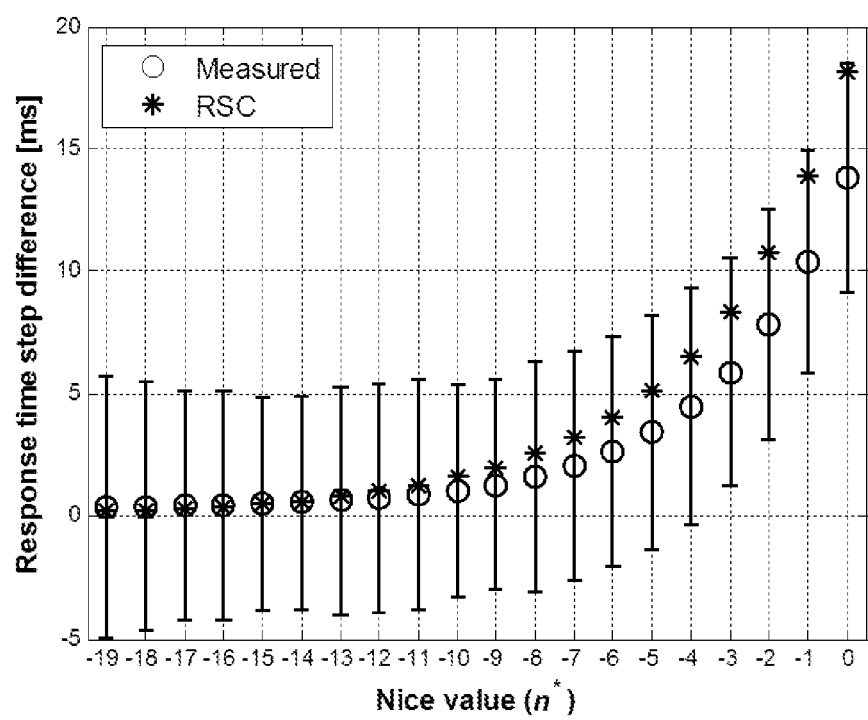
FIG. 3, FIG. 4, FIG. 5, and FIG. 6 are graphs of actual test results that show how the power consumption was improved in a smart device by the control of the CPU for improving application processing speed and power consumption according to an embodiment of the invention.
Figure 4:
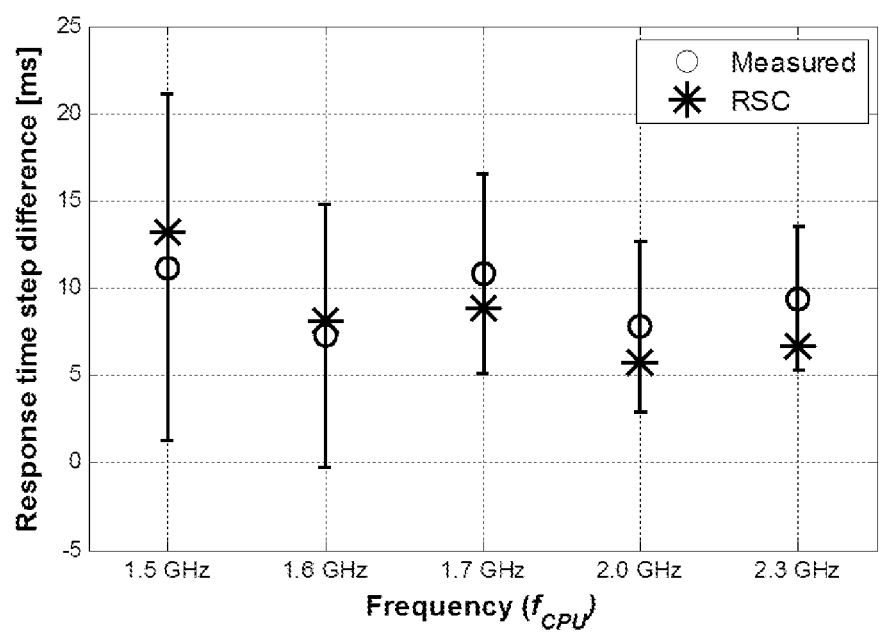

FIG. 3 and FIG. 4 are results comparing the validity of Equation 2 with actual measured values for Samsung's Galaxy S4 LTE-A smart phone.

Here, a CPU Stress application which creates various loads for the CPU was run as a background application. It can be seen that the measured values are similar to the results of Equation 2 or the results are within a 95% confidence level of the measured results.

Figure 5:
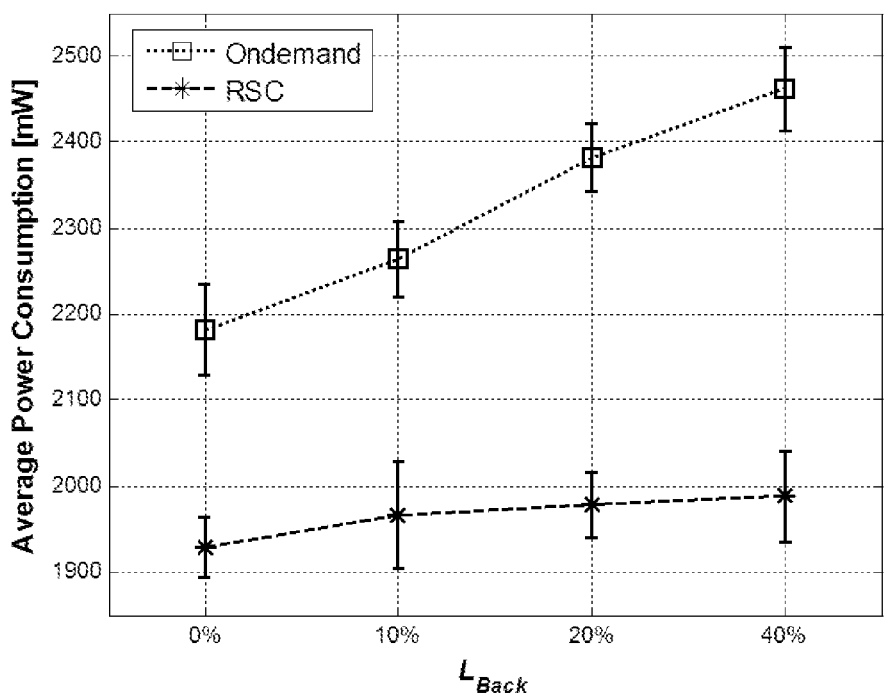

FIG. 5 shows test results concerning the power consumption of a smart device.

Compared with the Ondemand Governor, it can be seen that there is always a gain in power consumption regardless of the CPU load applied by the background application.

Figure 6:
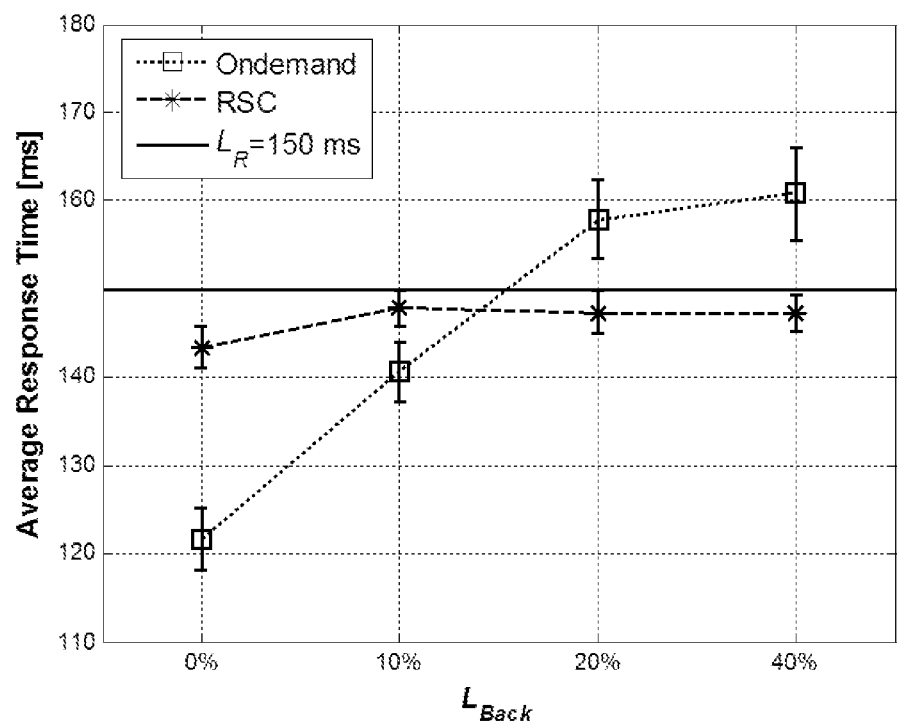

FIG. 6 shows test results concerning the reaction time of the application.

With the Ondemand Governor, it can be seen that the $L_R$ value is not exceeded when there is no background application or when a CPU load of 10% is applied, but when the CPU loads of 20% and 30% are applied, the $L_R$ value was exceeded.

With the RSC, it can be seen that the $L_R$ value is not exceeded regardless of the CPU load of the background application.

Although it may seem that the performance is lower compared with the Ondemand Governor when there is no background application or when a 10% CPU load is applied, this difference is not actually perceivable to users. Thus, the reaction time is intentionally increased by a level that is unperceivable to the users, to provide gains in terms of power consumption.

The embodiments of the present invention set forth above are for illustrative purposes. It would be appreciated by those of ordinary skill in the field of art to which the present invention pertains that the embodiments above can be easily modified to other specific implementations without departing from the technical spirit of the present invention and without changing the essential features of the present invention.

Thus, the embodiments described above are merely given as examples and do not limit the present invention.

For example, a component described as an integrated form can be used in a distributed form, while components described as being in a distributed form can be used coupled together.

The scope of the present invention is to be defined by the scope of claims set forth below, and it is to be appreciated that all variations and modifications which can be derived from the meaning and scope of the claims as well as their equivalents are encompassed by the scope of the present invention.

What is claimed is:

1. A method of controlling a CPU, the method performed by a CPU control apparatus, the method comprising:
  (a) measuring a reaction time of a user terminal for a running application;
  (b) computing a first reaction time by stepwise changing a CPU frequency if the reaction time exceeds a preset threshold;
  (c) computing a second reaction time by stepwise changing a processing weight of the application if the first reaction time exceeds the preset threshold; and
  (d) repeating said step (c) if the second reaction time exceeds the preset threshold,
  (e) adjusting the CPU frequency and the processing weight of the application based on the changed CPU frequency and the changed processing weight that correspond to the second reaction time that does not exceed the preset threshold,
  wherein the step (a) computes the reaction time of the user terminal by the following equation, $$T_R(f_x, n^*_y) = T_R(f_{CPU}, n^*) + \Delta_R$$

wherein the step (b) and step (c) compute change of the first reaction time and the second reaction time by the following equation in order to compute the first reaction time and the second reaction time, $$\Delta_R = T_S(f_x)\frac{w_{n^*_y} + \sum_{\forall i \in S} w_{n^i}}{w_{n^*_y}} - T_S(f_{CPU})\frac{w_{n^*} + \sum_{\forall i \in S} w_{n^i}}{w_{n^*}}$$

$T_R(f_x, n^*_y)$ represents a predictive reaction time, $T_R(f_{CPU}, n^*)$ represents a reaction time measured by a reaction time measurement part, $f_{cpu}$ is the value of the current CPU frequency, $f_x$ represents the value to which the CPU frequency will be changed, $w_i$ represents the value of the processing weight of application i, $w^*$ represents the value of the processing weight of the target application, and $w^*_y$ represents the value to which the processing weight of the target application will be changed, $T_s$ is a service time of the running application, S represents the set of tasks being processed by the CPU, excluding the target application, and ΔR represents change of the first reaction or the second reaction time.

2. The method of claim 1, wherein the changed CPU frequency is set as a current CPU frequency if the first reaction time is smaller than or equal to the preset threshold, and
the changed processing weight is set as a current processing weight if the second reaction time is smaller than or equal to the preset threshold.

3. The method of claim 1, wherein said step (b) comprises:
setting a current CPU frequency to a maximum frequency and initializing the processing weight if the reaction exceeds the preset threshold; and
computing the first reaction time based on a frequency that is lowered one step from the maximum frequency and the initialized processing weight, if the current CPU frequency is not a minimum frequency, for a plurality of CPU frequency steps.

4. The method of claim 3, wherein said step (c) comprises:
computing the second reaction time based on a processing weight that is lowered one step from the initialized processing weight and the one-step lowered frequency, if a current processing weight is not a minimum processing weight, for a plurality of CPU frequency steps.

5. The method of claim 2, wherein said step (a) comprises:
measuring the reaction time of the user terminal based on the current CPU frequency of the user terminal and the current processing weight of the application.

6. The method of claim 1, wherein said step (a) comprises:
measuring the reaction time of the user terminal based on a time value during which the application received processing by the CPU in a user mode and a kernel mode since a first operation of the application in an operation system kernel.

7. A CPU control apparatus for controlling a CPU, the CPU control apparatus comprising:
a processor; and
a memory storing one or more programs configures to be executed by the processor, the one or more programs comprising instructions for:
(a) measuring a reaction time of a user terminal for a running application;
(b) computing a first reaction time by stepwise changing a CPU frequency if the reaction time exceeds a preset threshold;
(c) computing a second reaction time by stepwise changing a processing weight of the application if the first reaction time exceeds the preset threshold; and
(d) repeating said step (c) if the second reaction time exceeds the preset threshold,
(e) adjusting the CPU frequency and the processing weight of the application based on the changed CPU frequency and the changed processing weight that correspond to the second reaction time that does not exceed the preset threshold,
wherein the step (a) computes the reaction time of the user terminal by the following equation, $T_R(f_x, n^*_y) = T_R(f_{CPU}, n^*) + \Delta_R$ wherein the step (b) and step (c) compute change of the first reaction time and the second reaction time by the following equation in order to compute the first reaction time and the second reaction time, $$\Delta_R = T_S(f_x)\frac{w_{n^*_y} + \sum_{\forall i \in S} w_{n^i}}{w_{n^*_y}} - T_S(f_{CPU})\frac{w_{n^*} + \sum_{\forall i \in S} w_{n^i}}{w_{n^*}}$$

$T_R$ ($f_x$, $n^*_y$) represents a predictive reaction time, $T_R$ ($f_{CPU}$, $n^*$) represents a reaction time measured by a reaction time measurement part, $f_{cpu}$ is the value of the current CPU frequency, $f_x$ represents the value to which the CPU frequency will be changed, $w_i$ represents the value of the processing weight of application i, $w^*$ represents the value of the processing weight of the target application, and $w^*_y$ represents the value to which the processing weight of the target application will be changed, $T_s$ is a service time of the running application, S represents the set of tasks being processed by the CPU, excluding the target application, and ΔR represents change of the first reaction or the second reaction time.

8. The apparatus of claim 7, wherein the changed CPU frequency is set as a current CPU frequency if the first reaction time is smaller than or equal to the preset threshold, and
the changed processing weight is set as a current processing weight if the second reaction time is smaller than or equal to the preset threshold.

9. The apparatus of claim 7, wherein said step (b) comprises:
setting a current CPU frequency to a maximum frequency and initializing the processing weight if the reaction exceeds the preset threshold; and
computing the first reaction time based on a frequency that is lowered one step from the maximum frequency and the initialized processing weight, if the current CPU frequency is not a minimum frequency, for a plurality of CPU frequency steps.

10. The apparatus of claim 9, wherein step (c) comprises:
computing the second reaction time based on a processing weight that is lowered one step from the initialized processing weight and the one-step lowered frequency, if a current processing weight is not a minimum processing weight, for a plurality of CPU frequency steps.

11. The apparatus of claim 8, wherein said step (a) comprises:
measuring the reaction time of the user terminal based on the current CPU frequency of the user terminal and the current processing weight of the application.

12. The apparatus of claim 7, wherein said step (a) comprises:
measuring the reaction time of the user terminal based on a time value during which the application received processing by the CPU in a user mode and a kernel mode since a first operation of the application in an operation system kernel.

* * * * *